US011912056B2

(12) United States Patent
Hecker et al.

(10) Patent No.: US 11,912,056 B2
(45) Date of Patent: Feb. 27, 2024

(54) IDENTIFICATION DOCUMENT DATA PAGE AND RELATED PRODUCTION METHOD

(71) Applicant: HID Global CID SAS, Suresnes (FR)

(72) Inventors: Hermann Hecker, Berlin (DE); Alice Vermeulin, Paris (FR); Marie Vangheluwe, Le Cannet (FR)

(73) Assignee: HID Global CID SAS, Suresnes (FR)

( * ) Notice: Subject to any disclaimer, the term of this patent is extended or adjusted under 35 U.S.C. 154(b) by 0 days.

(21) Appl. No.: 18/145,434

(22) Filed: Dec. 22, 2022

(65) Prior Publication Data

US 2023/0191822 A1 Jun. 22, 2023

Related U.S. Application Data

(63) Continuation of application No. 17/309,550, filed as application No. PCT/EP2019/082669 on Nov. 27, 2019, now Pat. No. 11,554,602.

(30) Foreign Application Priority Data

Dec. 5, 2018 (EP) .................................... 18210486

(51) Int. Cl.
*B42D 25/24* (2014.01)
*B42D 25/351* (2014.01)

(52) U.S. Cl.
CPC ........... *B42D 25/24* (2014.10); *B42D 25/351* (2014.10)

(58) Field of Classification Search
CPC .............................. B42D 25/24; B42D 25/351
See application file for complete search history.

(56) References Cited

U.S. PATENT DOCUMENTS

2007/0182154 A1 8/2007 Hoeppner et al.
2014/0265295 A1 9/2014 Rhyner et al.
(Continued)

FOREIGN PATENT DOCUMENTS

CA 2538530 C * 1/2011 ............. B42D 25/00
CA 2538530 C 1/2011
(Continued)

OTHER PUBLICATIONS

WO-2014203199-A1 English Translation (Year: 2014).*
(Continued)

*Primary Examiner* — Kyle R Grabowski
(74) *Attorney, Agent, or Firm* — Schwegman Lundberg & Woessner, P.A.

(57) ABSTRACT

The invention relates to a multilayer structure (2) intended to be inserted in an identification document and comprising: at least one first layer (4) at least partially opaque forming a data area (6), the first layer (4) comprising at least one through opening (8) integrally confined by at least partially opaque material of the first layer (4), and a second layer (10) at least partially transparent extending at least partially on the data area (6) in order to extend into the through opening (8), the second layer (10) comprising a part extending beyond the first layer (4) and forming an edge part (12), the second layer (10) comprising at least one element forming a security element, the security element being present and/or visible on and/or in the edge part (12) and in the through opening (8) of the first layer (4).

19 Claims, 2 Drawing Sheets

(56) References Cited

U.S. PATENT DOCUMENTS

| | | | |
|---|---|---|---|
| 2015/0283847 A1 | 10/2015 | Lim et al. | |
| 2018/0147881 A1 | 5/2018 | Endres et al. | |
| 2019/0126661 A1 | 5/2019 | Erickson | |
| 2021/0331510 A1 | 10/2021 | Hecker et al. | |

FOREIGN PATENT DOCUMENTS

| | | | | | |
|---|---|---|---|---|---|
| DE | 102004055495 A1 | | 5/2006 | | |
| DE | 102009010800 B3 | | 7/2010 | | |
| DE | 102014010462 B3 | | 5/2015 | | |
| EP | 1731327 A1 | | 12/2006 | | |
| EP | 2433809 A1 | | 3/2012 | | |
| FR | 2993204 A1 | | 1/2014 | | |
| GB | 2543054 A | * | 4/2017 | ............. | B32B 27/08 |
| WO | WO-2014203199 A1 | * | 12/2014 | ............. | B32B 27/08 |
| WO | WO-2014203199 A1 | | 12/2014 | | |
| WO | WO-2017006191 A1 | | 1/2017 | | |
| WO | WO-2017081508 A1 | | 5/2017 | | |
| WO | WO-2019002129 A1 | | 1/2019 | | |
| WO | WO-2020114845 A1 | | 6/2020 | | |

OTHER PUBLICATIONS

"U.S. Appl. No. 17/309,550, Non Final Office Action dated Feb. 18, 2022", 8 pgs.
"U.S. Appl. No. 17/309,550, Non Final Office Action dated May 27, 2022", 9 pgs.
"U.S. Appl. No. 17/309,550, Notice of Allowance dated Sep. 15, 2022", 7 pgs.
"U.S. Appl. No. 17/309,550, Preliminary Amendment filed Jun. 4, 2021", 11 pgs.
"U.S. Appl. No. 17/309,550, Response filed May 16, 2022 to Non Final Office Action dated Feb. 18, 2022", 14 pgs.
"U.S. Appl. No. 17/309,550, Response filed Aug. 29, 2022 to Non Final Office Action dated May 27, 2022", 11 pgs.
"International Application Serial No. PCT/EP2019/082669, International Preliminary Report on Patentability dated Jun. 17, 2021", 8 pgs.
"International Application Serial No. PCT/EP2019/082669, International Search Report dated Apr. 14, 2020", 5 pgs.
"International Application Serial No. PCT/EP2019/082669, Written Opinion dated Apr. 14, 2020", 5 pgs.
"WO2014203199A1 English Translation", (2014).

* cited by examiner

IDENTIFICATION DOCUMENT DATA PAGE AND RELATED PRODUCTION METHOD

CROSS-REFERENCE TO RELATED APPLICATION(S)

This application is a continuation of U.S. patent application Ser. No. 17/309,550, titled "Identification Document Data Page and Related Production Method," filed Jun. 4, 2021, which is a national stage application under 35 U.S.C. § 371 of PCT Appl. No. PCT/EP2019/082669, titled "Identification Document Data Page and Related Production Method," filed Nov. 27, 2019, which claims priority to European Pat. Appl. No. 18210486.9, filed Dec. 5, 2018, each of which is hereby incorporated by reference herein in its entirety.

FIELD OF THE INVENTION

The invention relates to a multilayer structure 2 such as a data page intended to be inserted into an identification document and a manufacturing process of such a data page.

BACKGROUND OF THE INVENTION

A data page (or biodata page) is a part of an identification document, such as a passport, including the information of the holder, such as name, date of birth, etc., and consequently forming a data area. The data page is sewn into the passport booklet using a flexible part, extending beyond the data area, and called the "hinge". The data page consists of several layers, which can contain holes, and a thermoplastic material, and which are laminated together.

Identification documents are becoming increasingly important. These documents must be kept secure from tampering to ensure that counterfeiters or tamperers cannot produce counterfeit identification documents or tamper such identification documents without leaving any mark after the identification document falsification.

In order to enhance the security of identification documents, it is known, in document EP 2 401 158 B1, to produce a security document in which a security element continuously extends from the data page area onto the hinge area in order to duplicate the security element in different parts of the data page. The security element is carried by a specific layer and is visible in integrality.

It is also known, in document EP 2 433 809 A1, to produce an identification document in which a security element carried by the hinge extends on both sides of the sewing line, this element being visible on a data area in continuity of the hinge (e.g., without any interruption between the two areas).

Finally, it is known in document US 2014/0265295 A1 to produce a data page comprising an opening and a hinge, a security element being visible through a window, that is to say a transparent area on the data page which can be seen from at least one side of the data page.

It was found that the solutions disclosed in the documents listed above can have security gaps, mainly considering the increase of the techniques available for counterfeiters or tamperers.

Furthermore, the processes used to manufacture data pages according to these documents can require several lamination steps, which increase the complexity and the costs of these processes.

BRIEF SUMMARY OF THE INVENTION

Therefore, it is an objective of the invention to increase the security of a data page by providing a data page which is much more difficult to tamper than the data pages of the prior art.

This object is achieved by providing a multilayer structure intended to be inserted in an identification document and comprising:

- at least one first layer at least partially opaque forming a data area, the first layer comprising at least one through opening integrally confined by at least partially opaque material of the first layer,
- a second layer at least partially transparent extending at least partially on the data area in order to extend into the through opening, the second layer comprising a part extending beyond the first layer and forming an edge part, the second layer comprising at least one element forming a security element, the security element being present and/or visible on and/or in the edge part and in the through opening of the first layer.

Thus, the multilayer structure (called herein after "data page") comprises a single layer, the at least transparent second layer, forming simultaneously the window of the data page and the hinge and comprising the same security element which can be observed (in addition to the visual properties of the transparent layer) at two distinct points of the data page. Consequently, it becomes much more difficult to tamper an identification document comprising a data page as enounced above because of the repetition of the security element. For example, if a tamperer cuts the data page and attaches a new one to a hinge, there will be no more correlation between the security element on the hinge and the new data area.

The multilayer according to the invention can include at least one of the following characteristics:

- the edge part forms a hinge part of the multilayer structure,
- the security element is visible or detectable under specific condition on and/or in the edge part and through the through opening of the first layer,
- the multilayer comprises two first layers, the second layer being arranged in-between the two first layers,
- only one of the first layers comprises at least one through opening,
- the two first layers comprise at least one through opening, the through openings being at least partially overlapping each other,
- the second layer comprises a transponder coil having a chip or being chipless,
- the thickness of the second layer ranges between 70 μm and 500 μm, preferably between 150 μm and 500 μm,
- the second layer extends integrally between the two first layers and forms borders integrally surrounding the two first layers,
- the through opening is located at least 3 mm away from the hinge edge part, preferably at a distance at least equal to the third of the width of the data area,
- the security element of the second layer is chosen among the following security elements included inside the second layer or arranged on the second layer: organic or metallic additives, dyes, at least one light guide, at least one fluorescent printout, at least one security elongated element such as a security thread, fluorescent fibers and a photo-sensitive material, and
- the multilayer structure is a data page and the identification document is a passport.

The invention also concerns an identification document such as a passport, an identity card, a driver's license, or a travel pass including a multilayer structure according to the invention.

The invention also concerns a method of fabricating a multilayer structure intended to be inserted in an identification document, characterized in that it comprises the following steps:

- providing at least one at least partially opaque first sheet forming a data area with at least one through opening integrally confined by at least partially opaque material,
- providing an at least partially transparent second sheet comprising at least one element forming a security element,
- positioning the first sheet and the second sheet against one another so that the second sheet extends on the through opening, beyond the first sheet and that the security element is present in the through opening and on a part of the second sheet extending beyond the first opaque sheet, and
- at least assembling the first sheet and the second sheet together so that the material from the second sheet flows in the through opening.

The method according to the invention can include at least one of the following characteristics:

- the second sheet is positioned between two first sheets, at least one of the first sheets being provided with a through opening,
- the two first sheets are provided with a through opening, the two first sheets being positioned on both sides of the second sheet so that the through openings are at least partly overlapping to each other,
- the second sheet flows around borders of the first sheet during the lamination step,
- a transponder coil is inserted into the second sheet before the positioning step, and
- the security element is realized using one of the following elements included inside the second sheet or arranged on the second sheet: organic or metallic additives, dyes, at least one light guide, fluorescent printout, at least one security elongated element such as a security thread, fluorescent fibers and a photo-sensitive material.

BRIEF DESCRIPTION OF THE DRAWINGS

Some embodiments of the invention are given as non-limiting examples in support of the attached figures in which.

DETAILED DESCRIPTION

Figure 1:
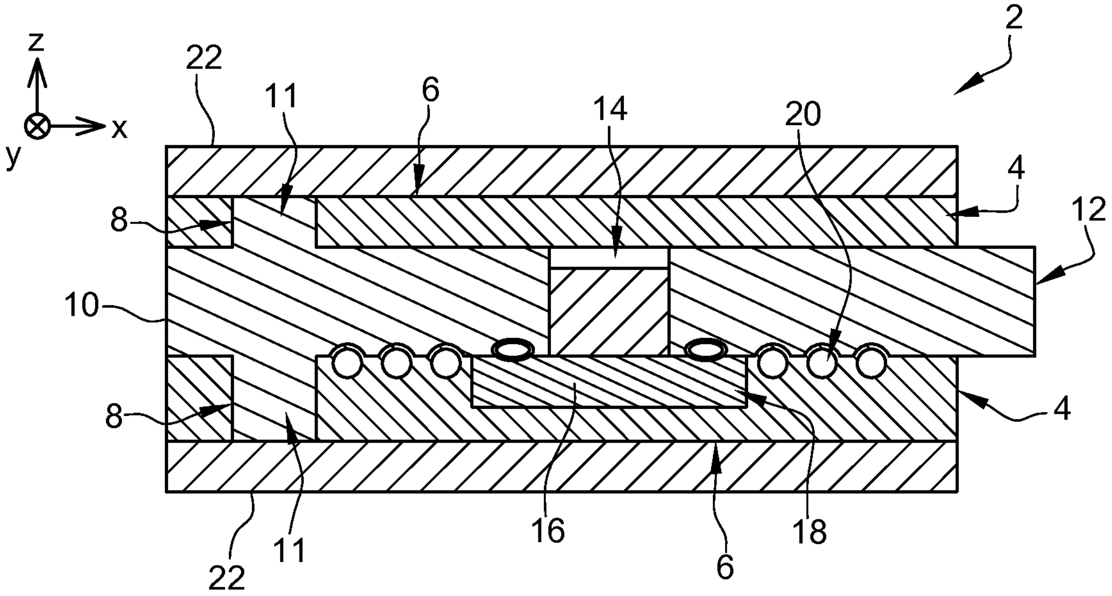
FIG. 1 is a section view of a multilayer structure according to the invention.

Referring now to FIG. 1 illustrating a multilayer structure 2 intended to be inserted into an identification document such as a passport. The multilayer structure 2 will be named afterwards "data page 2". This data page 2 comprises two at least partially opaque first layers 4. These first layers 4 are for example made of white polycarbonate. These first layers 4 form data areas 6 located on each side of the data page 2 and comprising the information of the holder, such as name, date of birth, etc. The inscription of this information can be made using common techniques, for example by laser engraving.

The two first layers 4 comprise one or more through openings 8 (the number of through openings can vary) which are integrally confined by at least partially opaque material of the opaque layers 4. In other words, the through opening 8 perimeter defines a closed loop integrally surrounded by opaque material of the opaque layers 4. The through opening 8 is confined by at least partially opaque material in directions according to axes X and Y (see the orthonormal system on FIG. 1). The through opening is not surrounded by at least partially opaque material in a direction according to the axis Z. Consequently, these through openings 8 forming closed openings can be considered as forming closed windows 11.

An at least partially transparent second layer 10 is arranged in-between the two first layers 4. Preferably, this layer can be made in thermoplastic polyurethane. This second layer 10 extends at least partially (it can be an integral extension) between the two first layers 4 in order to extend into the through openings 8. The extension of the second layer 10 into the through openings 8 forms windows 11, that is to say a part of the data page in which the internal second layer 10 is visible through the first layers 4.

The second layer 10 also extends beyond the first layers 4, more precisely on one side of these layers, in order to form an edge part 12 which can be a hinge used to attach the data page 2 to the identification document such as a passport booklet, for example by sewing. The edge part 12 could also be the edge of a card. It may comprise or may not comprise some data. The thermoplastic polyurethane has the advantage to be a flexible material, and consequently, a good material for the function of a hinge. The first layers 4 can cover all the surface of the second layer 10 except the edge part 12 which is only constituted by the second layer 10.

The second layer 10 can be provided with an opening 14 in its part sandwiched between the two first layers 4 in order to receive a transponder coil 16 composed of a chip 18 (having in this case a T-shape) and an antenna 20 comprising two endpoints in contact with the chip 18. The transponder is maintained in position thanks to the structure of the data page 2 in which it is compressed between the first layers 4. This kind of transponder is known of a person skilled in the art and will not be described in detail.

The thickness of the second layer 10 may vary from 70 μm to 500 μm, preferably form 150 μm to 500 μm, depending on the number of layers added to manufacture the data page 2 or the material used for these layers.

The data page 2 may have transparent overlays 22 in order to give an optimal finished appearance to the data page 2. These overlays 22 can be made of transparent polycarbonate.

Figure 2:
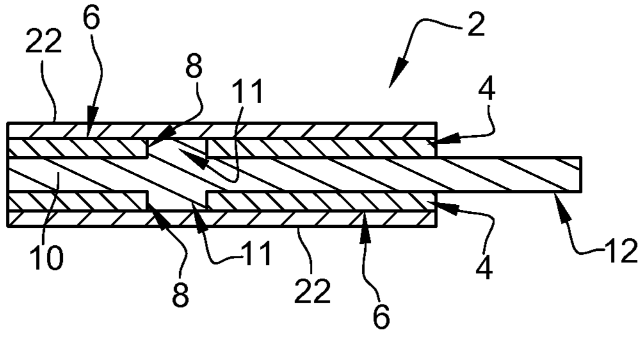
FIGS. 2 to 4 are section views of three embodiments of a multilayer structure according to the invention.
Figure 3:
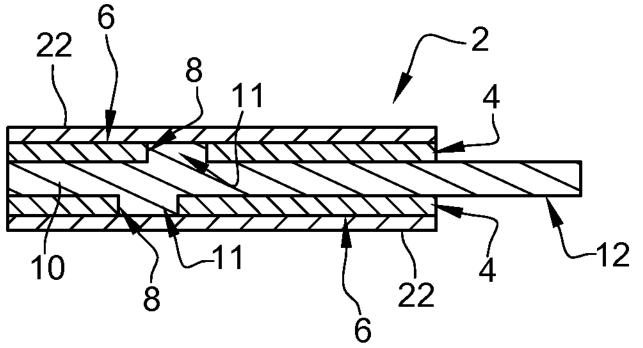

Concerning the through openings 8, each first layer 4 may have at least one of these through openings 8, as illustrated on FIGS. 1 to 3. Consequently, at least one window 11 is created on both sides of the data page 2.

These through openings can be made by punching the first layers 4. It is possible to adapt some polycarbonate perforation technology such as the realization of a watermark, e.g., multiple small holes into the first layers 4 due to multiple perforations in order to allow the creep of the second layer 10 into these holes to create multiple windows. The data page 2 may thus have a plurality of windows forming a security feature that can be detectable or visualized under specific condition (for example by using a UV lamp) by any authority controlling the authenticity of the data page 2.

This concept is based on removing part of the first layers 4 before the collating phase, which locally reduces the opacity of the final laminate, for example using a $CO_2$ laser perforation technique. A removal factor can be defined using the diameter of the holes and the spacing between holes as parameters.

During lamination, the first layers 4 reach beyond the softening temperature which cause the plastic melting and the layer fusion to produce the final laminate. The creep of the second layer 10 into the holes prevent the filling of these holes by the opaque layer's material which is in fusion.

Thanks to this technique various images, characters or patterns can be realized by means of a plurality of windows, which can be of relatively small dimensions.

According to a first embodiment illustrated at FIG. 2, the two through openings 8 can be integrally overlapping to each other in order to create a window which can be visualized on both sides of the data page 2 in an identical way. This window can be named a "see-through window" or "open window". Consequently, the same security feature is visible from each side of the data page 2.

According to a second embodiment illustrated at FIG. 3, the two through openings 8 may be partially overlapping to each other. It is also possible to provide each first layer 4 with through holes 8 having different forms and/or sizes. Consequently, the visual effect would be different on each side of the data page 2. For instance, a circle can be arranged on one side (on a first layer 4) and text on the other side (on the other first layer 4) such as ASCII characters, symbols or different shapes on both sides. Such a structure can be named "offset window" (two windows which are partially overlapping and creating an open window in the overlap area).

Figure 4:
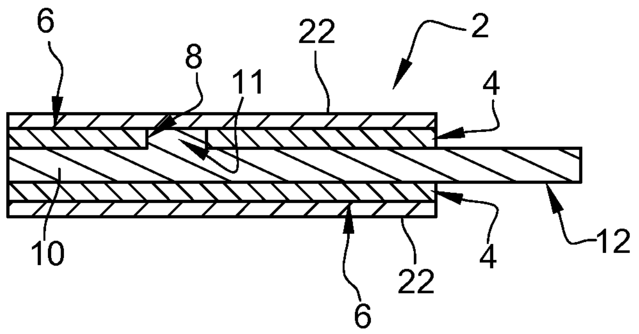

According to a third embodiment illustrated at FIG. 4, only one first layer 4 may have a through opening 8. The window which is formed can be named a "one side window".

A window 11, e.g., a through opening 8 filled with the second layer 10 material, is integrally confined by at least partially opaque material, that is to say that borders form a continuous loop surrounding the window 11. The through opening 8 (and consequently the windows 11) can have various forms and sizes.

Preferably, the through opening(s) 8 is located at least 3 mm away from the edge part 12, preferably at a distance at least equal to the third of the width of the data page 2. A gap is then created between the window(s) 11 and the edge part 12 in order to increase the security of the document (the link between the window(s) 11 and the edge part 12 becoming more difficult to visualize).

As explained above, the second layer 10 comprises at least one element forming a security element (not shown) (the security element is included inside the second layer (10) or arranged on the second layer (10)). This security element is present and/or visible in and/or on the edge 12 and in the through opening(s) 8 of the first layer(s) 4 (through the window(s) 11). This feature can be chosen among the non-exhaustive following list of processes and security features obtained using these processes:

- doping the second layer 10 with organic or metallic additives for coating UV or IR response, or secured with fibers and micro-dots. According to this technique, it is not possible to alter window(s) 11 and the edge part 12 separately;
- the use of dyes embedded into the second layer 10, printed or coated on microstructures integrated into the second layer 10;
- the incorporation of a light guide in order to link a pattern which is on the edge part 12 with a pattern which is visible through the through opening(s) 8. It is then possible to light the pattern which is visible through the through opening(s) 8, a hidden waveguide connection linking the two patterns allowing to transfer energy to the pattern which is on the edge part 12 and which becomes apparent. The break of the waveguide prevents the energy transfer and consequently the appearance of the pattern which is on the edge part 12 or vice-versa;
- the printing of fluorescent printouts (visible under UV light) on the edge part 12 and on the portion of the second layer 10 which is visible in the through opening (s) 8, possibly physically interlinked or at least correlated. The use of this technique has a further advantage when the edge part 12 is a hinge: cutting and splicing the hinge requires to heat the hinge and the temperature increase distort the fluorescent printouts, which is easily detectable;
- for one-side windows, the incorporation of security elongated elements such as threads which are usually used for banknotes. The security thread (several security threads can be incorporated) extends into the edge part 12 and the data area. This thread is visible on the edge part 12 because it is transparent and on the data area whenever the thread extends in a through opening 8. Consequently, the security thread is visible in an intermittent way. The thread can be metallized, demetallized (demetallized holographic thread), visible under UV light through particles, etc. The metallized security thread can be personalized using a laser and it does not crack during a lamination process;
- the incorporation of fluorescent fibers into the second layer 10. The data page 2 would have at least one window 11 through which the second layer 10 (made of the same material than the edge 12) is visible. Under fluorescent light, fibers would show in the edge part 12 and in through opening(s) 8. This proves that the same materials are used in both areas. This would hinder the replacement of a hinge with another clear material. In addition, cutting a hinge and splicing it back would be difficult without leaving traces in the fluorescent fibers; and
- the use of a material which is photo sensitive to a laser irradiation printed or added into the second layer 10. The material that linked the edge part 12 and the window(s) 11 (particles, printing, threads . . . ) can be photo-sensitive to a laser irradiation, wherein a permanent irreversible pattern (image, code like letters or numbers) can be engraved on both the edge part 12 and the window(s) 11. The pattern will be more likely the same between these two areas of the data page 2 to increase the binding effect, but can have some dissimilarity or dissimilarities, as different size of the pattern for example, or color disparity under UV lamp, etc. The photo sensitive results can be irreversible photochromism, origination of UV sensible properties, effect of darkening by carbonization, metallization effect, demetalization effect, iridescence creation, embossing outcome (as bubbles) and/or semi-ablation outcome.

Figure 5:
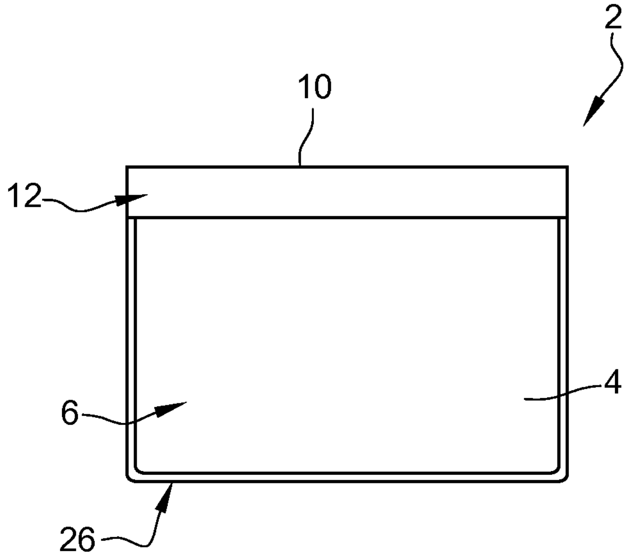
FIGS. 5 and 6 are front views of a multilayer structure according to the invention.

Furthermore, the second layer 10 can extend integrally between the first layers 4 and form borders 26 surrounding the first layers 4 in order to obtain a better finished appearance, as it is illustrated at FIG. 5.

Figure 6:
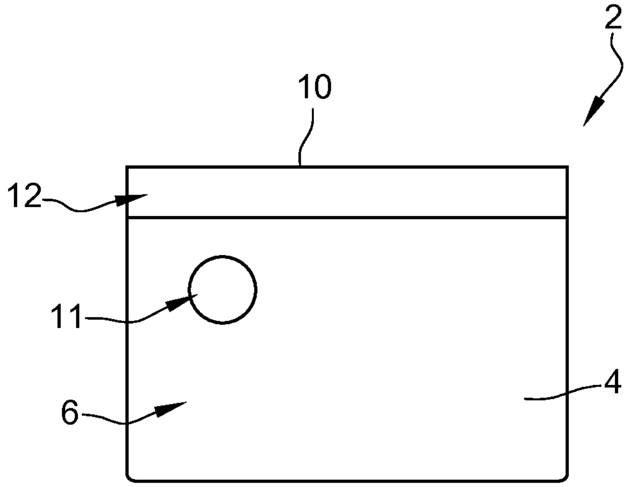

FIG. 6 illustrates the data page 2 without any border 26 when the window 11 is visible and integrally confined by at least partially opaque material.

Concerning the manufacturing method of a data page 2 as described above, the following steps are executed:

- providing at least one first sheet at least partially opaque (precursor of the first layer 4) with at least one through opening 8 as described above;
- providing a second sheet at least partially transparent (precursor of the transparent layer 10) comprising at least one element forming a security element as described above;
- positioning the first sheet and the second sheet against one another so that the second sheet extends on the through opening 8, beyond the first sheet (in order to create the future edge part 12) and that the security feature is present in the through opening 8 and on a part of the second sheet extending beyond the first sheet; and
- assembling the first sheet and the second sheet together. The assembling can, for instance, be carried out by lamination process, 3D printing, fusing or any other applicable process.

The data page 2 is preferably manufactured with this one-step lamination process. The benefit lies in a cost-effective way to manufacture a data page 2 component or a final data page 2 with window 11.

The second sheet flows in the through opening 8 in order to create a window 11. This creep allows to use different shapes/patterns of the through opening 8. This is very advantageous since the edge part 12 and the window 11 is formed in one step during the manufacturing process and that it does not need the use of a patch to fill the through opening 8 and form the window 11. Moreover, the window 11 and the edge part 12 can be linked with the same security feature associated with the second sheet. The security elements, that also fill or cover the full or partial surface/area of the second sheet, are associated to this specific second sheet before any collating or first lamination process of the data page 2.

As described above, the second sheet can be sandwiched between two first sheets. The second sheet is then positioned between two first sheets as described above, at least one of the first sheets being provided with a through opening.

If the two first sheets are provided with a through opening 8, the first sheets can be positioned on both sides of the second sheet so that the through openings 8 are at least partially overlapping to each other.

The second sheet can flow around borders of the first sheet during the lamination process. This allows to create borders 26 surrounding the first sheet.

As described above, a transponder coil 16 may be incorporated into the second sheet before lamination.

The invention is not limited to the embodiments described and other embodiments will become apparent to a person skilled in the art. For example, the use of another suitable security element could be intended. The composition of the second layer could be specific in order to constitute the security element (addition of a specific component into the second sheet). The method to make through openings can be different from methods described above. Other elements than the transponder coil can be inserted in the second layer or in the first layer(s).

NUMERICAL REFERENCES LIST

2: data page
4: first layer
6: data area
8: through opening
10: second layer
11: window
12: edge part
14: through hole
16: transponder coil
18: chip
20: antenna
22: transparent overlays
26: borders

The invention claimed is:

1. A multilayer structure for an identification document, the multilayer structure comprising:

- a first layer at least partially opaque forming a data area, the first layer comprising a through opening integrally confined by at least partially opaque material of the first layer; and
- a second layer at least partially transparent extending at least partially on the data area and into the through opening, the second layer comprising a part extending beyond the first layer and forming an edge part, the edge part forming a hinge of the multilayer structure configured for attaching the multilayer structure to the identification document;
- wherein the second layer comprises at least one element forming a security element, the security element comprising a holographic element being visible at the hinge and through the through opening of the first layer.

2. The multilayer structure according to claim 1, wherein the security element is visible under a specific condition at the hinge and through the through opening of the first layer.

3. The multilayer structure according to claim 1, comprising a third layer at least partially opaque, the second layer being arranged in-between the first layer and the third layer.

4. The multilayer structure according to claim 3, wherein the third layer is free of any through opening.

5. The multilayer structure according to claim 3, wherein the third layer comprises a through opening at least partially overlapping with the through opening of the first layer.

6. The multilayer structure according to claim 3, wherein the second layer comprises a transponder coil having a chip.

7. The multilayer structure according to claim 3, wherein the second layer extends integrally between the first and third layers and forms borders integrally surrounding the first and third layers.

8. The multilayer structure according to claim 1, wherein the thickness of the second layer ranges between 70 μm and 500 μm.

9. The multilayer structure according to claim 1, wherein the through opening is located at least 3 mm away from the edge part.

10. The multilayer structure according to claim 1, wherein the security element further comprises a fluorescent printed on the second layer and being visible under ultraviolet (UV) light at the hinge and through the through opening of the first layer.

11. The multilayer structure according to claim 1, wherein the multilayer structure is a data page and the identification document is a passport.

12. The multilayer structure according to claim 1, wherein the through opening is located at a distance from the edge part that is at least equal to a third of a width of the data area.

13. An identification document including a multilayer structure according to claim 1.

14. A method of fabricating a multilayer structure for an identification document, the method comprising:

providing an at least partially opaque first sheet forming a data area with a through opening integrally confined by at least partially opaque material of the first sheet;

providing an at least partially transparent second sheet comprising at least one element forming a security element comprising a holographic element;

positioning the first sheet and the second sheet against one another so that the second sheet extends on the through opening and beyond the first sheet forming a hinge of the multilayer structure configured for attaching the multilayer structure to the identification document, and so that the security element is visible through the through opening and at the hinge; and at least assembling the first sheet and the second sheet together so that the material from the second sheet flows into the through opening.

15. The method according to claim 14, wherein the second sheet is positioned between the first sheet and an at least partially opaque third sheet.

16. The method according to claim 15, wherein the third sheet is provided with a through opening, and wherein the first sheet and third sheet are positioned on both sides of the second sheet so that the through opening of the third sheet is at least partly overlapping with the through opening of the first sheet.

17. The method according to claim 14, wherein the second sheet flows around borders of the first sheet during the assembling step.

18. The method according to claim 14, wherein a transponder coil is inserted into the second sheet before the positioning step.

19. The method according to claim 14, wherein the security element further comprises a fluorescent printed on the second sheet that is visible under ultraviolet (UV) light.

* * * * *